United States Patent
Willbrandt et al.

(10) Patent No.: US 8,495,960 B2
(45) Date of Patent: Jul. 30, 2013

(54) RAILWAY VEHICLE WITH EXHAUST GAS CLEANING

(75) Inventors: Ralph Willbrandt, Oranienburg (DE); Steffen Jahn, Hennigsdorf (DE)

(73) Assignee: Bombardier Transportation GmbH, Berlin (DE)

( * ) Notice: Subject to any disclaimer, the term of this patent is extended or adjusted under 35 U.S.C. 154(b) by 163 days.

(21) Appl. No.: 12/919,056

(22) PCT Filed: Feb. 25, 2009

(86) PCT No.: PCT/EP2009/052229
§ 371 (c)(1),
(2), (4) Date: Dec. 16, 2010

(87) PCT Pub. No.: WO2009/106544
PCT Pub. Date: Sep. 3, 2009

(65) Prior Publication Data
US 2011/0088587 A1    Apr. 21, 2011

(30) Foreign Application Priority Data
Feb. 27, 2008 (DE) .......................... 10 2008 011 329

(51) Int. Cl.
*B61C 5/00* (2006.01)
(52) U.S. Cl.
USPC ........................................ 105/62.1; 105/62.2
(58) Field of Classification Search
USPC ................ 105/62.1; 123/254, 253, 26, 41.49, 123/339.18, 392
See application file for complete search history.

(56) References Cited

U.S. PATENT DOCUMENTS

| | | | | |
|---|---|---|---|---|
| 2,118,814 A | * | 5/1938 | Holzwarth | 105/62.1 |
| 2,667,843 A | * | 2/1954 | Dean | 105/62.2 |
| 4,321,898 A | * | 3/1982 | Latsch | 123/254 |
| 4,416,228 A | * | 11/1983 | Benedikt et al. | 123/268 |
| 2011/0088587 A1 | * | 4/2011 | Willbrandt et al. | 105/62.1 |

FOREIGN PATENT DOCUMENTS

| | | |
|---|---|---|
| CN | 1853035 A | 10/2006 |
| DE | 841830 C | 6/1952 |
| EP | 1886892 A1 * | 2/2008 |
| JP | 2003020936 A | 1/2003 |

OTHER PUBLICATIONS

Bogdanoff, Low-emission Locomotive Projects, Second CARB Public Meeting, South Coast Air Quality Management District, Jul. 13, 2006, pp. 1-13.

* cited by examiner

*Primary Examiner* — Jason C Smith
(74) *Attorney, Agent, or Firm* — The Webb Law Firm

(57) ABSTRACT

A rail vehicle comprising a vehicle body defining a vehicle interior, an internal combustion engine and an exhaust gas system in communication with the internal combustion engine for evacuating the exhaust gases of the internal combustion engine, wherein the exhaust gas system comprises an additive supply unit designed to supply an additive for pollutant reduction to the exhaust gas stream of the internal combustion engine, and the additive supply unit comprises a reservoir for the additive and a supply section connected thereto for supplying the additive to the exhaust gas stream. The reservoir and/or the supply section is arranged in at least one body chamber of the vehicle body, wherein the at least one body chamber is provided with sound insulation and/or thermal insulation at least in the areas adjacent to the vehicle interior and/or the environment of the vehicle, which are frequented by passengers.

25 Claims, 2 Drawing Sheets

RAILWAY VEHICLE WITH EXHAUST GAS CLEANING

BACKGROUND OF THE INVENTION

1. Field of the Invention

The present invention relates to a rail vehicle having a vehicle body defining a vehicle interior, an internal combustion engine and an exhaust system in communication with the internal combustion engine for evacuating the exhaust gases of the internal combustion engine, said exhaust gas system comprising an additive supply unit designed to supply an additive for pollutant reduction to the exhaust gas stream of the internal combustion engine, and said additive supply unit comprising a reservoir for the additive and a supply section in communication therewith for supplying the additive to the exhaust gas stream.

2. Description of the Related Art

In rail vehicles which generate their drive energy by means of an internal combustion engine, the development tasks are more and more focused on the aspect of exhaust gas cleaning, not least because of the increasingly stringent regulations with regard to the emission limits (including those for particles and nitric oxides) to be complied with. Since 2006, new legal exhaust gas regulations have gradually been introduced (so-called Level III a) in the European Union with stringent limits for new vehicles, which will be replaced in 2012 by even more stringent limits (so-called Level III b).

In order to reduce the pollutant content of exhaust gases in today's diesel engines, as a rule two different concepts are presently adopted, namely exhaust gas recirculation (AGR) or selective catalytic reduction (SCR), which may both be combined with a particle filter.

In the case of selective catalytic reduction (SCR), ammonia ($NH_3$) and carbon dioxide ($CO_2$) are initially obtained from urea stored as a solid or in an aqueous solution, which ammonia and carbon dioxide are then mixed with the nitric oxides of the exhaust gases and are converted in the SCR catalyst into nitrogen and water. Here, due to the simpler handling, there appears to be a tendency towards the use of the urea-water mix.

The aqueous urea solution which is, amongst others, sold under the trade name AdBlue®, is stored in an appropriate tank and is introduced through nozzles into the hot exhaust gas stream via corresponding components of the additive supply unit. In this hot exhaust gas stream it reduces the nitric oxide proportion of the exhaust gas by way of a chemical reaction in the SCR catalysts. The service temperature of the urea solution is here limited at the bottom end by its freezing point ($-11°$ C.). At the top end, the service temperature or the storage temperature of the urea solution is limited by the temperature, at which the urea solution begins to decompose.

So far, this urea solution has predominantly been used in heavy goods vehicles, busses and passenger cars, however, even rail vehicles such as for example the motor cars of the Regio-Shuttle RS1 type of the company Stadler Pankow GmbH, Berlin, Del., have been designed with corresponding systems for exhaust gas cleaning. Especially with heavy goods vehicles, the tank for the urea solution is as a rule mounted close to the engine outside of the vehicle body on the vehicle frame. The same applies analogously to the SCR catalysts as well as to the feed lines from the tank to the SCR catalysts, which are also arranged outside of the vehicle body in a comparably unprotected manner. All of these components of the additive supply unit are thus directly exposed to environmental influences in a comparatively unprotected manner.

As a rule, these components of the additive supply unit are both subject to ambient temperatures and to the effects of the operation of the vehicle so that, as a rule, they have to be provided with appropriate thermal insulation and/or with means for heating/cooling, and they also have to be designed in an appropriately robust manner so as to be able to withstand environmental effects. As a result, a comparatively complex design of the components of the additive supply unit is required.

SUMMARY OF THE INVENTION

The present invention is therefore based on the object of providing a rail vehicle of the above-mentioned kind, which does not, or only to a reduced degree, have the above-mentioned disadvantages and which enables, in particular, a simpler and more cost-effective design of the exhaust system or of the components of the additive supply unit to be achieved.

The present invention is based on the technical teaching that a simple and cost-effective design of the exhaust gas system or of the additive supply unit becomes possible if the reservoir and/or the supply section of the additive supply unit and/or a catalyst for pollutant reduction is/are provided in at least one body chamber of the vehicle body, wherein the at least one body chamber is provided with sound insulation and/or thermal insulation at least in the areas adjacent to the vehicle interior and/or the environment of the vehicle, which are frequented by passengers.

By arranging said components in the body chamber it becomes possible to design the respective components of the additive supply unit or the exhaust gas system itself in a comparatively simple manner and so that they merely correspond to the respectively required core function (i.e. optimal storage or optimal supply of the additive or optimal exhaust gas cleaning), since the protective function from environmental effects (such as thermal and/or mechanical effects) may be taken over by the walls of the respective body chamber. These walls of the respective body chamber themselves may in turn by designed in a comparatively simple and cost-effective manner, since they only need to provide the respective protective function.

The easy to design sound insulation and/or thermal insulation in the areas which are adjacent to areas frequented by passengers, does here of course not only provide for the protection of the respective components from environmental effects, but also any passengers present inside or outside of the vehicle are effectively protected in a simple manner from any negative effects (noise and/or heat) from the respective components of the additive supply unit.

According to one aspect, the present invention therefore relates to a rail vehicle comprising a vehicle body defining a vehicle interior, an internal combustion engine and an exhaust gas system in communication with the internal combustion engine for evacuating the exhaust gases of the internal combustion engine, said exhaust gas system comprising an additive supply unit designed to supply an additive for pollutant reduction to the exhaust gas stream of the internal combustion engine and said additive supply unit comprising a reservoir for the additive and a supply section connected thereto for supplying the additive to the exhaust gas stream. The reservoir and/or the supply section and/or a catalyst for pollutant reduction is provided in at least one body chamber of the vehicle body, wherein the at least one body chamber is provided with sound insulation and/or thermal insulation at least in the areas adjacent to the vehicle interior and/or the environment of the vehicle, which are frequented by passengers.

In principle, the supply section may be designed in any desired suitable way. In particular, it may comprise any suitable components for cleaning the exhaust gases of the internal combustion engine or for reducing their pollutant content. In preferred variants of the invention, the supply section may comprise at least one catalyst for pollutant reduction, in particular an SCR catalyst.

The additive may be stored in the form of any desired end, intermediate or primary products and may here also be stored in any desired physical condition (for example in a solid, liquid or gaseous condition). In the case of storage in the form of a primary or intermediate product, the supply section includes a corresponding processing unit which makes the additive available in the condition required for supplying it to the exhaust gas stream.

Preferably, however, it is provided for the reservoir to be a tank, in which the additive is stored in a liquid condition, since in this variant some more or less complicated processing may as a rule be dispensed with. Due to its ready availability and uncomplicated handling, an aqueous urea solution, in particular a 32.5% urea solution is preferably used as the additive.

In the rail vehicle according to the invention, a tempering unit for tempering the additive is preferably provided, said tempering unit being designed for tempering at least one component of the reservoir and/or at least one component of the conduits carrying the additive from the tank to the supply section and/or at least one component of the supply section. As a result, it becomes possible on the one hand to use the additive again for pollutant reduction at any point of the operation (for example also after a longer period of standstill at temperatures below the service temperature range of the additive), at least as soon as after a brief warming-up time, and on the other hand it may be prevented that the additive becomes unusable due to exposure to high storage or usage temperatures over longer periods of time.

However, it will be appreciated that in other variants of the rail vehicle according to the invention such active cooling and/or heating means may also be absent, since for example in the case of a start after a longer period of standstill at temperatures below the service temperature range of the additive it may be acceptable that the additive will not be available until after a longer period of time (until the service temperature range of the additive has been reached).

The tempering unit may in principle be designed in any desired suitable way, as long as it is ensured that the desired temperature distribution in the additive is achieved sufficiently quickly. The tempering unit preferably comprises an electrically operated heating pipe and/or a heating pipe fed by a coolant circuit of the internal combustion engine, because these variants are particularly simple to realise.

Particularly advantageous variants of the rail vehicle according to the invention distinguish themselves by the fact that the tempering unit comprises at least one cooling device which keeps the additive within its service temperature range even at high ambient temperatures, in this way preventing the additive from becoming useless as a result of being exposed to excessively high temperatures.

The cooling device, too, may principally be designed in any desired suitable way, provided a sufficiently reliable adherence to an upper limit for the temperature of the additive (which lies below the decomposition temperature) is ensured. Preferably, a multiple use of components of the vehicle is provided here, in order to design the vehicle as a whole as simple and as cost-effective as possible. In this connection, active components (fans, heat exchangers, compressors, active screens etc.) and/or passive components (cooling channels, coolant conduits, passive screens etc.) of cooling units for other components or parts of the vehicle (in particular parts of an air conditioning unit of the vehicle or the like) may be used. The cooling device preferably comprises at least one fan of a cooling device of the internal combustion engine, since this provides as a rule a sufficient air flow.

In principle, the reservoir may be mounted at any desired location in the rail vehicle. It is, however, especially favourable if the reservoir is arranged adjacent to the internal combustion engine. By this means, a rapid cooling down of the additive during operation under partial load or in particular after turning the internal combustion engine off may be prevented in a simple manner by virtue of the waste heat of the engine, without an additional heating device having to be operated.

It is of particular advantage if the reservoir is mounted in a first body chamber, said first body chamber forming the engine compartment for the internal combustion engine. By this means, on the one hand the waste heat of the engine may be utilised in a simple manner as just described, and on the other hand the insulation of the engine compartment (typically an encapsulation of the engine compartment which is as complete as possible), which as a rule is present anyway, may also take over the function of insulating the reservoir, so that no separate insulation has to be provided for this purpose. Preferably the first body chamber is therefore essentially completely provided with sound insulation and/or thermal insulation against its environment.

The first body chamber may principally be located at any desired suitable location (in the longitudinal, transverse and/or height direction) in the rail vehicle. In particular, it may be located in the roof area as well as at the level of the passenger area. Particularly favourable is an underfloor arrangement, since in this case easy filling of the reservoir becomes possible. Preferably, the vehicle body therefore defines a floor level for passengers in the vehicle interior, and the first body chamber is arranged below said floor level.

The supply section, the catalyst for pollutant reduction and the reservoir may be arranged in the same body chamber. However, it is preferable for the supply section and/or the catalyst for pollutant reduction to be arranged in a separate second body chamber. As a result, on the one hand the design of the respective body chamber becomes simpler and on the other hand a greater degree of design freedom is obtained, especially for the arrangement of the supply section or the catalyst for pollutant reduction.

Also the second body chamber may in principle be located in any desired suitable location (in the longitudinal, transverse and/or height direction) in the rail vehicle. It may in particular be arranged in the roof area as well as at the level of the passenger area or underfloor. Particularly favourable is an arrangement of the second body chamber in the area of a lateral wall and/or a front wall of the vehicle body, because it may be integrated there (not least because it is as a rule of an elongated design) in a particularly simple and space-saving manner.

Such an integration may be realised in a particularly simple and unobtrusive way by providing that the second body chamber defines a column-like section in the interior of the vehicle body, since such column-like sections are frequently provided in the interior of rail vehicles anyway and may be readily installed in areas which are not needed for the transport of passengers anyway. Especially unobtrusive is an integration of the second body chamber in the area of a door opening of the vehicle body.

As will be explained in detail below, it is of advantage especially with a view to a simple tempering of the supply section or the catalyst for pollutant reduction, if the supply section or the catalyst for pollutant reduction and thus also the second body chamber primarily extends in the height direction of the rail vehicle. Preferably, however, it is provided for the second body chamber to extend in the height direction of the vehicle body over at least 50% of the height of the vehicle body. The vehicle interior preferably includes a passenger compartment and the second body chamber extends in the height direction of the vehicle body over the height of the passenger compartment. By this means, a convection which is favourable for a desired tempering (heating and/or cooling) may be achieved in a particularly simple manner within the second body chamber. This may be a natural convection and/or a convection which is forced by corresponding active (fans etc.) and/or passive means (baffles using the driving air flow, nozzle-shaped sections etc.).

In advantageous variants of the rail vehicle according to the invention it is therefore provided for the supply section or the catalyst for pollutant reduction to be formed to be elongated, with the supply section or the catalyst for pollutant reduction defining a longitudinal axis orientated in the height direction of the vehicle body. Preferably, a convection unit for generating convection for cooling the supply section or the catalyst for pollutant reduction is provided in the second body chamber. In order to be able to realise a particularly simple tempering of the supply section or the catalyst for pollutant reduction without any further (in particular active) auxiliary means, the convection unit comprises a free flow cross section formed between the supply section and the wall of the second body chamber, said free flow cross section being dimensioned such that during operation of the vehicle, a natural convection sufficient only for cooling the supply section is obtained.

In order to be able to realise the tempering of the supply section or the catalyst for pollutant reduction via a corresponding forced and/or natural convection in a particularly simple manner, it is preferably provided for the second body chamber to have at least one air outlet opening and preferably also at least one air inlet opening, so that convection can occur, without any significant flow resistances having to be overcome. It is particularly favourable here if the air outlet opening is provided in the area of an upper end of the second body chamber, whereas the air inlet opening is provided in the area of a lower end of the second body chamber.

BRIEF DESCRIPTION OF THE DRAWINGS

Further preferred embodiments of the invention will become evident from the dependent claims or the description of preferred embodiments which is given below with reference to the attached drawings. It is shown in:

DESCRIPTION OF THE PREFERRED EMBODIMENTS

First Embodiment

A first preferred embodiment example of the rail vehicle 101 according to the invention will be described below with reference to FIGS. 1 and 2. In order to aid in the understanding of the following explanation, FIGS. 1 and 2 show a coordinate system, wherein the x coordinate indicates the longitudinal direction of the rail vehicle 101, the y coordinate indicates the transverse direction of the rail vehicle 101 and the z coordinate indicates the height direction of the rail vehicle 101.

Figure 1:
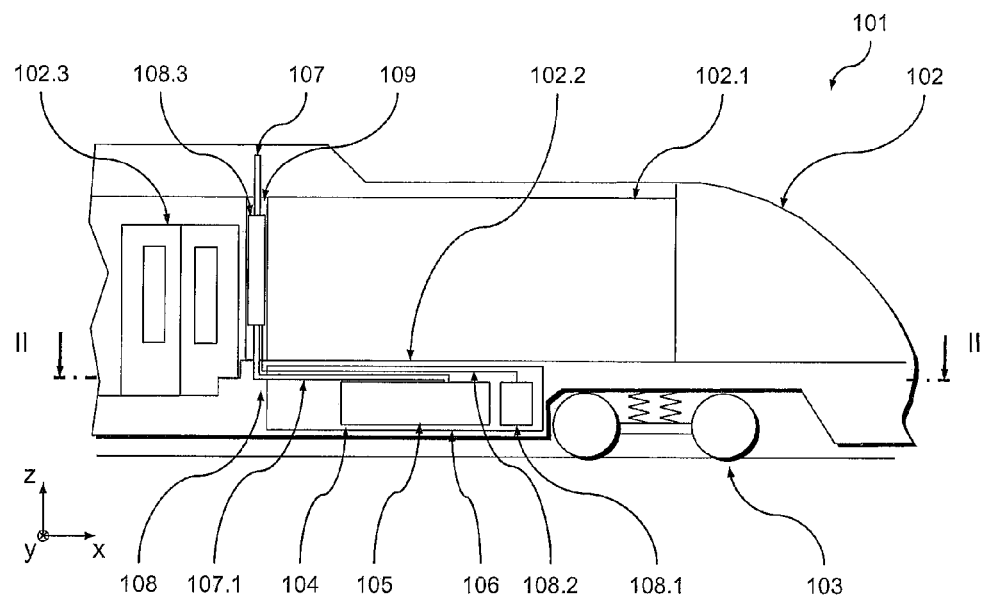
FIG. 1 a schematic sectional view of a preferred embodiment of the vehicle according to the invention.
Figure 2:
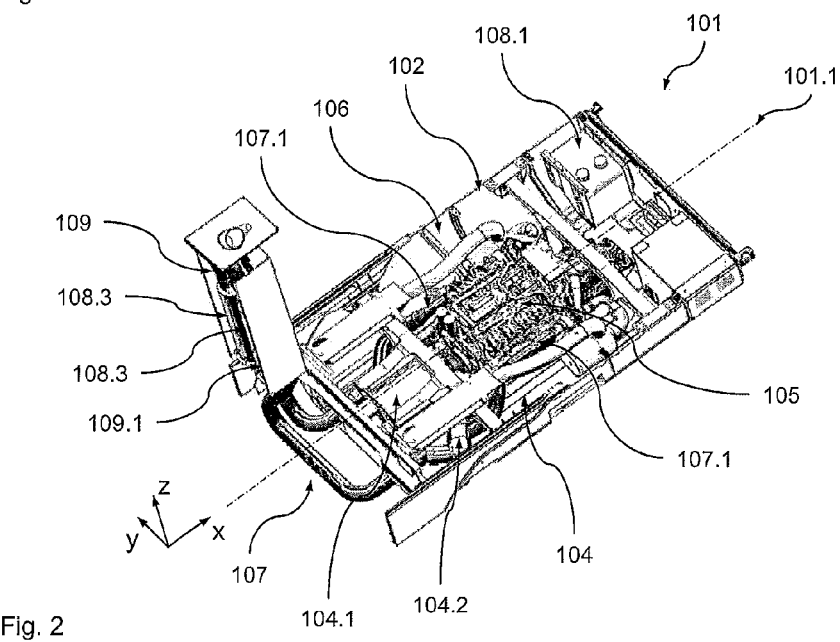
FIG. 2 a schematic perspective view of a portion of the vehicle according to FIG. 1.

FIG. 1 shows a schematic lateral view of a portion of the vehicle 101, which has a longitudinal vehicle axis 101.1. The vehicle 101 comprises a vehicle body in the form of a wagon body 102 which is supported on its front end on a running gear in the form of a bogie 103. The other end (not shown in FIG. 1) of the wagon body 102 is supported on a further running gear, for example on a further bogie.

The wagon body 102 defines a vehicle interior 102.1 which is used for transporting passengers. The vehicle interior 102.1 has a floor 102.2 which in turn defines a floor level. In the longitudinal direction of the vehicle 101, a drive unit 104 having an internal combustion engine in the form of a diesel engine 105 is mounted behind the bogie 103.

The diesel engine 105 may be directly connected to the wheel set transmission units of the driven wheels of the drive bogies of the vehicles 101 via a hydrodynamic or hydromechanical transmission unit. In the present example, however, the diesel engine 105 drives a generator 104.1 which then provides the drive energy for the electric drive motors of the drive bogies of the vehicle 101.

The drive unit 104 is mounted underfloor in a first body chamber 106 of the wagon body 102 below floor level. This first body chamber 106 (which is shown in FIG. 2 in a cut-away view at the level of line II-II from FIG. 1) is provided all around, except for the required air inlet openings and air outlet openings, with sound insulation and thermal insulation, in order to shield or encapsulate the engine compartment defined in the first body chamber 106 against the environment, especially against the areas frequented by passengers or passers-by inside or outside of the vehicle 101. If required, also the air inlet openings and the air outlet openings are arranged and designed in such a way that sound emissions from the engine compartment 106 are kept as low as possible.

By this encapsulation of the engine compartment 106 it is achieved that passengers inside of the vehicle and people outside of the vehicle are on the one hand exposed to as little annoying noise from the vehicle as possible, and on the other hand it is achieved that these people will not be exposed to any excessive negative effects caused by the thermal radiation of the diesel engine.

On the one hand it will be appreciated that the sound insulation and the thermal insulation may be realised by the same components, on the other hand it will be appreciated that only those areas of the engine compartment may be provided with an appropriate insulation which are adjacent to areas which during normal operation of the vehicle will be frequented by people inside and outside of the vehicle 101 during normal operation. In particular it may also be provided that the underside of the engine compartment, which faces the rails, in the areas where during normal operation of the vehicle (for example in regular scheduled operation) no people will be present, will only be closed with an appropriate cover, but will not be provided with a special insulation.

The diesel engine 105 is connected to an exhaust gas system 107 which discharges the exhaust gases of the diesel engine 105 into the environment of the vehicle 101. The exhaust gas system 107 comprises for each cylinder bank of the diesel engine 105 an exhaust gas pipe 107.1, through which the exhaust gas is evacuated. In each of these exhaust gas pipes 107.1, one or more particle filters may be respectively integrated, in order to filter particles out of the exhaust gas.

In addition, a supply section of an additive supply unit 108 is interposed within each exhaust gas pipe 107.1. The additive supply unit supplies an additive to the exhaust gas stream, which converts, in a catalytic reaction, for example a so-called selective catalytic reduction (SCR), the nitric oxides ($NO_x$) in the exhaust gas into nitrogen and water.

To this end, the additive supply unit 108 comprises a reservoir in the form of a tank 108.1, in which the additive is stored in liquid form. The additive may be a urea solution (for example a 32.5% urea solution as is usually marketed under the trade name AdBlue®). It will be appreciated, however, that in other variants of the invention also additives of a different composition and/or in another physical condition (for example in the form of a solid or a gas) may be used, by way of adding of which to the exhaust gas (which, if required, is not carried out until after some suitable processing) a corresponding cleaning of the exhaust gas, in particular a corresponding reduction of the nitric oxide proportion in the exhaust gas, may be achieved.

In the present example, the additive is transported from the tank 108.1 to the respective supply section through one or more supply conduits 108.2 in the form of a catalyst 108.3. Part of the additive is then sprayed through injection nozzles before or in the area of the catalyst 108.3 and is supplied to the exhaust gas, so that the above-described catalytic reduction and the nitric oxide reduction resulting therefrom may take place before the cleaned exhaust gas is emitted into the environment in the roof area of the wagon body 102. The non-injected part of the additive is used for cooling the injection nozzles and is returned to the tank 108.1. It may be used there in certain operation conditions (warming-up phase etc.), amongst other things, for tempering the additive.

As has already been mentioned above, the service temperature range of the additive is limited at the bottom end by its freezing point (in the example of the 32.5% urea solution, the freezing point is approximately −11° C.). At the top end, the service temperature or the storage temperature range of the additive is limited by the temperature at which the additive begins to decompose. As a consequence, the additive has to be tempered in order to ensure that it remains within this service temperature range. However, with the present invention it is possible to keep the effort for achieving this at a minimum.

Thus, positioning the tank 108.1 for the additive within the engine compartment 106 has the advantage that a special thermal insulation for the tank 108.1 may be dispensed with, since this function may already be taken over by the insulation of the engine compartment 106. In the above-mentioned cases, in which the underside of the engine compartment is not provided with such an insulation, it may merely be necessary to provide a simple (for example in the form of a plate) insulation on the underside of the tank. Moreover, the insulation of the engine compartment 106 may be of a simpler design than a separate insulation of the tank, because the air space between the tank 106 and the wall of the engine compartment 106 already contributes to a thermal insulation.

The installation of the tank 108.1 as well as of a large proportion of the supply conduits 108.2 in the insulated engine compartment 106 in the vicinity of the diesel engine 105 has the further advantage that the waste heat of the diesel engine 105 as well as of the exhaust gas pipes 107.1 may be utilised in a simple manner (if necessary even without any further auxiliary means) for tempering the additive. Thus, this waste heat which, thanks to the insulation, only slowly dissipates from the engine compartment 106 under low engine load or even after turning the diesel engine 105 off, may (thanks to the insulation of the engine compartment 106) ensure a temperature above the freezing point of the additive in the tank 108.1 and of the parts of the supply conduits 108.2 which run within the engine compartment 106 for a long time.

In order to enhance this effect, it may be provided under these operational conditions (e.g. low load, idle running, diesel engine 105 turned off etc.) that a cooling device (fan etc.) for the diesel engine 105 is either not operated or operated only with a reduced cooling output.

It is further ensured by means of this arrangement in the insulated engine compartment 106 and thus by the utilisation of the waste heat from the diesel engine 105, that even if the temperature falls below the freezing point of the additive (for example during a long period of standstill at very low ambient temperatures), the service temperature range of the additive will be achieved after only a comparatively short period of time, so that any additional heating devices for the additive may be dimensioned correspondingly small or may even be dispensed with (if for example a reduced exhaust gas cleaning during the warming-up phase of the vehicle is acceptable).

The supply conduit 108.2 is arranged mainly in the vicinity of the exhaust gas pipe 107.1, in order to ensure in a simple manner, via the heat output of the exhaust gas pipe 107.1, a suitable tempering of the additive in the supply conduit 108.2, so that, here too, any additional heating devices for the additive may be dimensioned correspondingly small or may even dispensed with.

In this connection it is also of advantage that the tank 108.1 and the supply conduit 108.2 are protected by virtue of their position in the engine compartment 106 from the air flow which would otherwise delay the time until the service temperature range is reached.

In the present example, additional heating devices are provided in the area of the intake opening of the tank 108.1 and in the area of the supply conduits 108.2, in order to ensure the availability of the additive and thus of the exhaust gas cleaning under any operating condition. The additional heating devices may be simple electric heating devices. They may also be pipes in which part of the coolant circulates from a coolant circuit of the diesel engine 105.

A further advantage of positioning the tank 108.1 and the supply conduit 108.2 within the engine compartment 106 is that, with a view to any possibly required cooling of the additive, any cooling air flow that has to be made available for the diesel engine 105 as well as for other components of the drive unit 104 anyway may also be used for cooling the additive. In other words, by this means an economical multiple use of such cooling devices (e.g. of the fan 104.2 etc.) is made possible.

Finally, positioning the tank 108.1 and the supply conduit 108.2 within the engine compartment 106 is of advantage insofar as they are protected in this way from mechanical effects (such as for example from hitting rocks or the like) in a simple manner.

The catalysts 108.3 arranged downstream of the diesel engine 105 are formed as elongate units which are orientated in the height direction of the vehicle 101 or the wagon body 102. The catalysts 108.3 are arranged in a column-like second body chamber 109 which is integrated in a lateral wall of the wagon body 102 in the area of the door 102.3 of the wagon body 102.

This integration in a lateral wall of the wagon body 102 in the area of the door 102.3 is of advantage in so far as the column created in this way in the passenger compartment 102.1 will restrict the freedom of movement for the passengers, if at all, only to a minor degree and, moreover, it will not be perceived as disturbing from an optical point of view. A further advantage is the fact that the waste heat from the components of the exhaust gas system 107, which extend in the second body chamber 109, may be used in order to ensure the functioning of the components of the door 102.3 even at low outside temperatures.

The second body chamber 109 extends over more than 50% of the height dimension of the wagon body 102 and, thus, completely through the passenger compartment 102.1, so that it will be perceived as a door column in the passenger compartment 102.1. The second body chamber 109 is provided with sound insulation and thermal insulation on the vertical lateral walls thereof, so that any passengers in the passenger compartment 102.1 as well as any passers-by outside of the vehicle 101 will not be excessively inconvenienced either by sound emissions or by heat output from the exhaust gas pipes 107.1 and the catalysts 108.3. Both sound insulation and thermal insulation may again be realised as one single unit, if required.

Here, too, the arrangement of the catalysts 108.3 and the remaining portion of the supply conduits 108.2 within the second body chamber 109 has the advantage that any special thermal insulation of a complex design for these components may be dispensed with, because this function may already be taken over by the insulation of the second body chamber 109, which may be designed in a particularly simple manner. Moreover, this may be designed in a simpler manner, because the air space between the components of the exhaust gas system 107 or the catalysts 108.3 and the wall of the second body chamber 109 already contributes to a thermal insulation.

The arrangement of the catalysts 108.3 and the remaining portion of the supply conduits 108.2 within the second body chamber 109 has the further advantage that the waste heat from the exhaust gas conduits 107.1 may be utilised in a simple manner (maybe even without any further auxiliary means) for tempering the additive at low ambient temperatures.

Here, it is in particular the vertical orientation of the exhaust gas pipes 107.1, of the catalysts 108.3 and of the remaining portion of the supply conduits 108.2 that is of advantage, because in this way a favourable natural convection may be achieved in the second body chamber 109 (similar to a chimney), which assists heat transfer.

In order to favour this natural convection even further and in order to achieve, if required, also a cooling effect by means of supplied ambient air, the second body chamber 109 has an air inlet opening at its lower end and an air outlet opening at its upper end, so that the vertical air flow can develop without obstruction in the second body chamber, whilst also a proportion of ambient air is entrained. Both the air inlet opening and the air outlet opening may each be provided for example externally in the lateral wall of the wagon body 102 and/or in the undercarriage or the roof area of the wagon body 102.

In addition, in order to favour a natural convection sufficient for any required cooling and/or heating of the additive, it is provided for the free flow cross section in the second body chamber 109, in particular between the catalysts 108.3 and the wall of the second body chamber 109, to be dimensioned such that during operation of the vehicle 101, a natural convection sufficient only for cooling the supply section is obtained.

However, it will be appreciated that, in other variants of the invention, also other active devices (fans etc.) and/or passive devices (baffles diverting the driving air flow into the second body chamber, nozzle-like sections etc.) may be provided, which effect a forced convection in the second body chamber.

Also in the area of the second body chamber 109, the waste heat from the exhaust gas pipes 107.1 or from the catalysts 108.3 can, even at low outside temperatures (by virtue of the insulation of the second body chamber 109), still ensure temperatures above the freezing point of the additive in the portions of the supply conduits 108.2, which extend in the second body chamber 109, for a long time after the diesel engine 105 has been turned off.

Further, by this arrangement in the insulated second body chamber 109 and thus by means of utilising the waste heat from the exhaust gas pipes 107.1 or from the catalysts 108.3 it is ensured that even if the temperature falls below the freezing point of the additive, the service temperature range of the additive will be reached again after just a comparatively short period of time, so that any additional heating devices for the additive may be dimensioned correspondingly small or may even be dispensed with (if for example a reduced exhaust gas cleaning during the warming-up phase of the vehicle is acceptable).

Also in the area of the second body chamber 109, the supply conduit 108.2 is run mainly in the vicinity of the exhaust gas pipe 107.1, in order to ensure a suitable tempering of the additive in the supply conduit 108.2 in a simple manner via the heat output of the exhaust gas pipe 107.1, so that here, too, any additional heating devices for the additive may be dimensioned correspondingly small or may even be dispensed with.

In this connection it is further of advantage that the supply conduit 108.2 is protected by its arrangement in the second body chamber 109 from the air flow which would otherwise delay the reaching of the service temperature range.

Finally, the arrangement of the supply conduit 108.2 within the second body chamber 109 is of advantage in that it is protected in this way from any mechanical effects (such as for example from hitting rocks and the like).

It is to be noted here that positioning the tank 108.1 underfloor is advantageous with regard to a simple filling of the tank 108.1 and the design of the filler neck or the filling pipe. Thus, the filler neck for the tank 108.1 may simply be located at the level of the upper edge of the tank 108.1 in the lateral wall of the wagon body 102 and thus at an easily accessible level. Moreover, a complex design of the filler neck or of the filling pipe becomes unnecessary in this way.

Second Embodiment

A further preferred embodiment of the rail vehicle 201 according to the invention will be described below with reference to FIGS. 3 and 4. Design and functionality of the rail vehicle 210 in principle correspond to those of rail vehicle 101 according to FIGS. 1 and 2, so that it is here mainly the differences that will be addressed. Identical or like components are identified using the same reference numerals increased by 100. Unless detailed information is given below, reference is herewith explicitly made to the explanation given above with regard to these components.

In order to aid in the understanding of the explanation given below, FIGS. 3 and 4 also show a coordinate system wherein the x coordinate indicates the longitudinal direction of the rail vehicle 201, the y coordinate indicates the transverse direction of the rail vehicle 201 and the z coordinate indicates the height direction of the rail vehicle 201.

Figure 3:
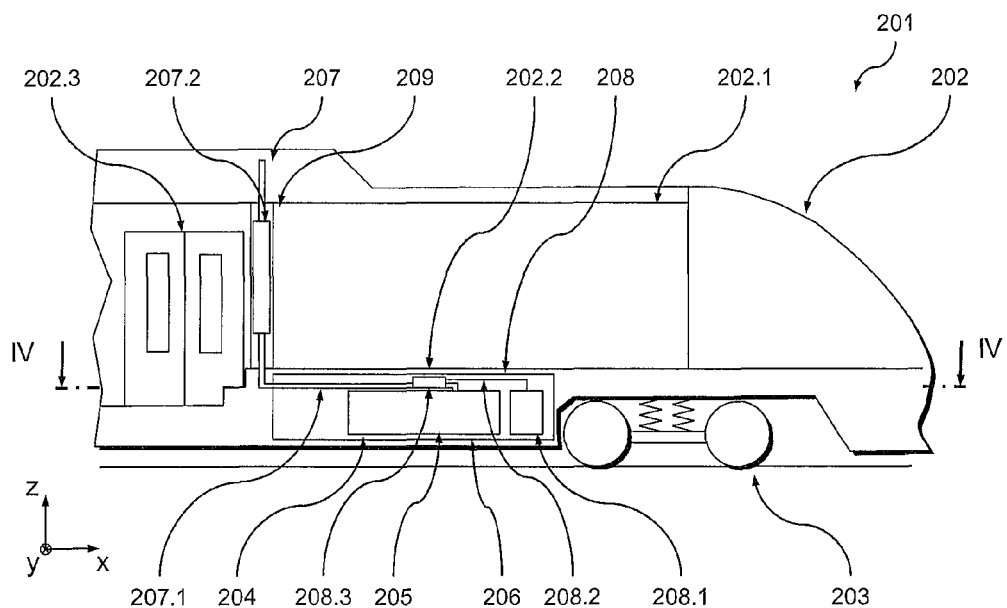
FIG. 3 a schematic sectional view of a further preferred embodiment of the vehicle according to the invention.
Figure 4:
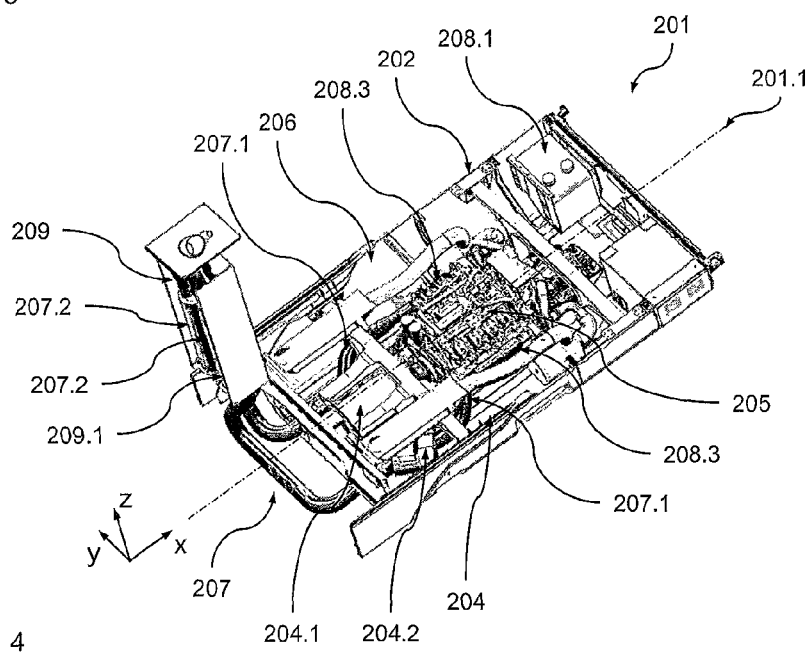
FIG. 4 a schematic perspective view of a portion of the vehicle according to FIG. 3.

FIG. 3 shows a schematic lateral view of a portion of vehicle 201, which has a longitudinal vehicle axis 201.1. Vehicle 201 comprises a vehicle body in the form of a wagon body 202, which is supported on its front end on a running gear in the form of a bogie 203. The other end (not shown in FIG. 1) of the wagon body 202 is supported on a further running gear, for example a further bogie.

The wagon body 202 defines a vehicle interior 202.1 which is used for transporting passengers. The vehicle interior 202.1 has a floor 202.2 which in turn defines a floor level. In the longitudinal direction of the vehicle 201, a drive unit 204 including an internal combustion engine in the form of a diesel engine 205 is mounted behind the bogie 203. The diesel engine 205 in turn drives a generator 204.1 which provides the drive energy for the electric drive motors of the drive bogies of the vehicle 201.

The drive unit 204 is arranged underfloor in a first body chamber 206 of the wagon body 202 below floor level. This first body chamber 206 (which is shown in FIG. 4 in a cutaway view at the level of line IV-IV from FIG. 3) is provided all around, except for the necessary air inlet openings and air outlet openings, with sound insulation and thermal insulation, in order to shield or encapsulate the engine compartment defined by the first body chamber 206 against the environment, in particular against the areas frequented by passengers or by passers-by inside or outside of the vehicle 201. If required, also the air inlet openings and the air outlet openings may be arranged and designed in such a way that sound emissions from the engine compartment 206 are kept as low as possible.

By means of this encapsulation of the engine compartment 206 it is achieved that passengers inside of the vehicle and people outside of the vehicle are on the one hand exposed to as little as possible annoyance noise by the vehicle, and on the other hand it is achieved that those people are not exposed to any excessive annoyance effects from the heat radiation by the diesel engine.

On the one hand it will be appreciated that the sound insulation and the thermal insulation may be realised by the same components, on the other hand it will be understood that only those areas of the engine compartment may be provided with an appropriate insulation, which are adjacent to the areas which during normal operation of the vehicle will be frequented by people inside and outside of the vehicle 201 during normal operation. In particular it may be provided that the underside of the engine compartment, which faces the rails, in the area of which no people will be present during normal operation of the vehicle (for example during regular scheduled operation), is merely closed with a corresponding cover, but is not provided with any special insulation.

The diesel engine 205 is in communication with an exhaust gas system 207, which discharges the exhaust gases of the diesel engine 205 into the environment of the vehicle 201. The exhaust gas system 207 comprises for each cylinder bank 205 of the diesel engine 205 one exhaust gas pipe 207.1, through which the exhaust gas is evacuated. Each of these exhaust gas pipes 207.1 may have integrated therein one or more particle filters, in order to filter particles out of the exhaust gas.

In addition, a supply section of an additive supply unit 208 may be interposed into each exhaust gas pipe 207.1. The additive supply unit supplies an additive to the exhaust gas stream, which converts the nitric oxides ($NO_x$) in the exhaust gas in a chemical reaction, a so-called selective catalytic reduction (SCR), into nitrogen and water.

To this end, the additive supply unit 208 comprises a reservoir in the form of a tank 208.1 in which an aqueous urea solution is stored. This urea solution may be a 32.5% urea solution as is usually marketed under the trade name AdBlue®. However, it will be appreciated that in other variants of the invention also additives having other compositions and/or being in other physical conditions (for example in the form of a solid or gas) may be used, by way of adding of which to the exhaust gas (if required upon some suitable processing) a corresponding cleaning of the exhaust gas, in particular a corresponding reduction of the nitric oxide proportion in the exhaust gas, may be achieved.

In the present example, the urea solution is transported from tank 208.1 through several supply conduits 208.2 to the respective supply section 208.3, which is arranged in the respective exhaust gas pipe 207.1 as far as possible upstream of the exhaust gas stream (i.e. as close as possible to the diesel engine 205) in areas where the exhaust gas temperature is as high as possible. Provided an exhaust gas turbocharger is present, the respective supply section 208.3 is preferably arranged immediately downstream of the exhaust gas turbocharger.

In the supply section 208.3, part of the urea solution is then sprayed via injection nozzles and is supplied to the exhaust gas. Here it is favourable to carry out the injection in an area with strong turbulence in the exhaust gas, in order to achieve a distribution of the urea solution droplets that is as uniform and as fine as possible. By the fine distribution of the droplets and the high temperature, a particularly good formation of ammonia ($NH_3$) and carbon dioxide ($CO_2$) in the exhaust gas is achieved. These will subsequently react in SCR catalysts 207.2 of the exhaust gas system 207, which are located further downstream, by way of the above-described selective catalytic reduction (SCR) with the nitric oxides ($NO_x$) of the exhaust gas and will effect in this way the desired nitric oxide reduction, before the cleaned exhaust gas is discharged into the environment in the roof area of the wagon body 202.

The non-injected part of the urea solution is used for cooling the injection nozzles and is returned to the tank 208.1, where it may be used under certain operation conditions (warming-up phase etc.), amongst other things, for tempering the urea solution.

As has already been mentioned in the beginning, the service temperature of the urea solution is limited at the bottom end by its freezing point, which is approximately −11° C. At the top end, the service temperature or storage temperature of the urea solution is limited by the temperature where the urea solution begins to decompose. As a consequence, the urea solution has to be tempered in order to ensure that the temperature stays within the service temperature range. With the present invention, however, it is possible also with this embodiment to keep the effort to achieve this to a minimum.

Thus, positioning the tank 208.1 for the urea solution within the engine compartment 206 has the advantage that any special thermal insulation for the tank 208.1 may be dispensed with, since this function may already be taken over by the insulation of the engine compartment 206. It may be that, in the above-described cases, where the underside of the engine compartment is not provided with such insulation, it may only be necessary to provide a simple (for example in the form of a plate) insulation on the underside of the tank. Moreover, the insulation of the engine compartment 206 may be of a simpler design than as a separate insulation of the tank, because the air space between the tank 206 and the wall of the engine compartment 206 already contributes to a thermal insulation.

The arrangement of the tank 208.1, the supply conduits 208.2 and the supply section 208.2 in the insulated engine compartment 206 in the vicinity of the diesel engine 205 has the further advantage that the waste heat from the diesel engine 205 as well as from the exhaust gas pipes 207.1 may be utilised in a simple manner (if required even without any further auxiliary means) for tempering the urea solution. Thus, this waste heat which, by virtue of the insulation, dissipates only slowly from the engine compartment 206, may ensure (by virtue of the insulation of the engine compartment 206) under low engine loads or even when the diesel engine 205 has been turned off that the temperature remains above the freezing point of the urea solution in the tank 208.1, the supply conduits 208.2 and the supply sections 208.3 for a long time.

In order to enhance this effect, it may be provided under these operating conditions (e.g. under a low load, during idle running, with the diesel engine 205 turned off etc.) that a cooling device (fan etc.) for the diesel engine 205 is either not operated or is operated only at a reduced cooling output.

By means of this arrangement in the insulated engine compartment 206 and thus by utilising the waste heat of the diesel engine 205 it is ensured that even if the temperature falls below the freezing point of the urea solution (for example in the case of a long period of standstill at very low ambient temperatures), the service temperature range of the urea solution will be reached after just a comparatively short period of time, so that any additional heating devices for the urea solution may be dimensioned correspondingly small or may even be dispensed with (if for example a reduced exhaust gas cleaning during the warming-up phase of the vehicle is acceptable).

The respective supply conduit 208.2 is run mainly in the vicinity of the engine 205 or of the exhaust gas pipe 207.1, in order to ensure in a simple manner via the heat output of the exhaust gas pipe 207.1 a suitable tempering of the urea solution in the supply conduit 208.2, so that, here too, any additional heating devices for the urea solution may be dimensioned correspondingly small or may even be dispensed with.

In this connection it is of further advantage if the tank 208.1, the supply conduits 208.2 and the supply sections 208.3 are protected by virtue of their arrangement in the engine compartment 206 from the air flow which would otherwise delay the reaching of the service temperature range.

In the present example, additional heating devices are provided in the area of the intake opening of the tank 208.1 and in the area of the supply conduits 208.2, in order to ensure the availability of the urea solution and thus of the exhaust gas cleaning under any operating condition. The additional heating devices may be simple electric heating devices. They may also be pipes in which part of the cooling liquid of the diesel engine 205 circulates.

A further advantage of the arrangement of the tank 208.1, the supply conduits 208.2 and the supply sections 208.3 within the engine compartment 206 is that, with a view to any possibly required cooling of the urea solution, a cooling air stream which may have to be provided for the diesel engine 205 as well as for other components of the drive unit 204 anyway, may be utilised in a simple manner also for cooling the urea solution. In other words, by this means an economical multiple use of such cooling devices (e.g. of the fan 204.2 etc.) becomes possible.

Finally, the arrangement of the tank 208.1, the supply conduits 208.2 and the supply sections 208.3 within the engine compartment 206 is of advantage in so far as they are protected in this way from mechanical effects (such as for example hitting rocks or the like) in a simple manner.

Die SCR catalysts 207.1 which are mounted downstream of the diesel engine 205 are formed as elongate units which are orientated in the height direction of the vehicle 201 or of the wagon body 202. The SCR catalysts 208.3 are mounted in a column-like second body chamber 209 which is integrated in a lateral wall of the wagon body 202 in the area of a door 202.3 of the wagon body 202.

This integration in a lateral wall of the wagon body 202 in the area of the door 202.3 is of advantage in so far as the column created thereby in the passenger compartment 202.1 on the one hand restricts the freedom of movement of the passengers, if at all, only to a minor degree and will also hardly be perceived as disturbing from an optical point of view. A further advantage lies in the fact that the waste heat from the components of the exhaust gas system 207, which extend in the second body chamber 209, may be used in order to ensure the function of the components of the door 202.3 also at low outside temperatures.

The second body chamber 209 extends over more than 50% of the height dimension of the wagon body 202 and thus completely through the passenger compartment 202.1, so that it is perceived as a door column in the passenger compartment 202.1. The second body chamber 209 is provided on its vertical lateral walls with sound insulation and thermal insulation, so that any passengers in the passenger compartment 202.1 as well as any passers-by outside of the vehicle 201 are not excessively inconvenienced either be the sound emissions nor by the heat output of the exhaust gas pipes 207.1 and the SCR catalysts 207.2. The sound insulation and the thermal insulation in turn may, if required, be realised as one unit.

Here too, the arrangement of the SCR catalysts 207.2 within the second body chamber 209 has the advantage that any special thermal insulation of a complex design for these components may be dispensed with, because this function may already be taken over by the insulation of the second body chamber 209, which is particularly easy to design. Moreover, this may be of a simpler design, because the air space between the components of the exhaust gas system 207, in particular the SCR catalysts 207.2, and the wall of the second body chamber 209 already contributes to a thermal insulation.

Here, it is in particular the vertical orientation of the exhaust gas pipes 207.1 and the SCR catalysts 207.2 that is of advantage, because by this means a favourable natural convection may be obtained in the second body chamber 209 (similar to a chimney), which favours a thermal transfer.

In order to favour this natural convection even further and to achieve, if required, also a cooling effect by means of supplied ambient air, the second body chamber 209 has at its bottom end an air inlet opening and at the other end an air outlet opening, so that the vertical air flow may freely form in the second body chamber 209, whilst also a proportion of ambient air is entrained. The air inlet opening as well as the air outlet opening may each be provided for example externally in the lateral wall of the wagon body 202 and/or in the undercarriage or in the roof area of the wagon body 202.

Further, in order to favour a natural convection sufficient for the required cooling, it is provided for the free flow cross section in the second body chamber 209, in particular between the SCR catalysts 207.2 and the wall of the second body chamber 209, to be dimensioned such that during operation of the vehicle 201 a natural convection is obtained, which is sufficient only for cooling the components of the exhaust gas system 207, which are located in the second body chamber 209.

It is to be understood, however, that in other variants of the invention also active devices (fans etc.) and/or passive devices (baffles diverting the driving air flow into the second body chamber, nozzle-like sections etc.) may be provided, which effect a forced convection in the second body chamber.

The present invention has been described above exclusively by means of examples including an engine compartment disposed underfloor or has been described as including a vertically orientated second body chamber. However, it is to be understood that the invention may be applied also in connection with any other desired arrangement of the engine compartment or the second body chamber. In particular, the engine compartment may also be positioned at the level of the passenger compartment (in a separate compartment) or even in the roof area of the vehicle. In other words, in other variants of the invention only one single body chamber (for example the engine compartment) may be provided, in which the tank, the supply unit and the exhaust gas system are arranged.

The invention claimed is:

1. A rail vehicle comprising
a vehicle body defining a vehicle interior,
an internal combustion engine, and
an exhaust gas system in communication with said internal combustion engine for evacuating said exhaust gases of said internal combustion engine, wherein
said exhaust gas system comprises an additive supply unit designed to supply an additive for pollutant reduction to said exhaust gas stream of said internal combustion engine, and
said additive supply unit comprises a reservoir for said additive and a supply section connected thereto for supplying said additive to said exhaust gas stream, wherein
said reservoir and/or said supply section and/or a catalyst for pollutant reduction is arranged in at least one body chamber of said vehicle body, and wherein
said at least one body chamber is provided with sound insulation and/or thermal insulation at least in said areas adjacent to said vehicle interior and/or the environment of said vehicle, which are frequented by passengers,
wherein said reservoir is disposed in a first body chamber, and wherein said first body chamber forms an engine compartment for said internal combustion engine.

2. The rail vehicle according to claim 1, wherein said supply section comprises a catalyst for pollutant reduction in said exhaust gas stream.

3. The rail vehicle according to claim 2, wherein said catalyst for pollutant reduction in said exhaust gas stream comprises an SCR catalyst.

4. The rail vehicle according to claim 1, wherein said reservoir is a tank in which said additive is stored in a liquid form.

5. The rail vehicle according to claim 4, wherein said additive is an aqueous urea solution.

6. The rail vehicle according to claim 5, wherein said aqueous urea solution comprises a 32.5% urea solution.

7. The rail vehicle according to claim 4, further comprising:
a tempering unit for tempering said additive is provided, wherein
said tempering unit is designed for tempering at least one component of said reservoir and/or at least one component of said conduits carrying said additive from said tank to said supply section and/or at least one component of said supply section.

8. The rail vehicle according to claim 7, wherein said tempering unit comprises an electrically operated heating pipe and/or a heating pipe fed by means of a coolant circuit of said internal combustion engine.

9. The rail vehicle according to claim 7, wherein said tempering unit comprises at least one cooling unit.

10. The rail vehicle according to claim 9, wherein said cooling unit comprises at least one fan of a cooling device of said internal combustion engine.

11. The rail vehicle according to claim 1, wherein said reservoir is mounted adjacent to said internal combustion engine.

12. The rail vehicle according to claim 1, wherein said first body chamber is essentially completely provided with sound insulation and/or thermal insulation against the environment thereof.

13. The rail vehicle according to claim 1, wherein
said vehicle body defines a floor level for passengers in said vehicle interior, and
said first body chamber is disposed below floor level.

14. The rail vehicle according to claim 1, wherein said supply section and/or a catalyst for pollutant reduction is/are arranged in a second body chamber.

15. The rail vehicle according to claim 14, wherein said second body chamber is positioned in the area of a lateral wall and/or a front wall of said vehicle body.

16. The rail vehicle according to claim 14, wherein said second body chamber extends in the height direction of said vehicle body over at least 50% of the height of said vehicle body.

17. The rail vehicle according to claim 14, wherein
said vehicle interior includes a passenger compartment, and
said second body chamber extends in the height direction of said vehicle body over the height of said passenger compartment.

18. The rail vehicle according to claim 14, wherein said second body chamber defines a column-like section in said interior of said vehicle body.

19. The rail vehicle according to claim 14, wherein said second body chamber is positioned in the area of a door opening of said vehicle body.

20. The rail vehicle according to claim 14, wherein
said supply section and/or said catalyst for pollutant reduction are formed to be elongated, wherein
said supply section and/or said catalyst for pollutant reduction defines a longitudinal axis which is orientated in the height direction of said vehicle body.

21. The rail vehicle according to claim 14, further comprising a convection unit for generating convection for cooling said supply section and/or said catalyst for pollutant reduction is provided in said body chamber.

22. The rail vehicle according to claim 21, wherein
said convection unit comprises a free flow cross section formed between said supply section and said wall of said second body chamber, wherein
said free flow cross section is dimensioned such that during operation of said vehicle, a natural convection sufficient only for cooling said supply section and/or said catalyst for pollutant reduction occurs.

23. The rail vehicle according to claim 14, wherein said second body chamber includes at least one air outlet opening.

24. The rail vehicle according to claim 23, wherein said second body chamber further includes at least one air inlet opening.

25. The rail vehicle according to claim 24, wherein
said air outlet opening is provided in the area of an upper end of said second body chamber, and
said air inlet opening is provided in the area of a lower end of said second body chamber.

* * * * *

UNITED STATES PATENT AND TRADEMARK OFFICE
CERTIFICATE OF CORRECTION

PATENT NO.       : 8,495,960 B2                                                                 Page 1 of 1
APPLICATION NO.  : 12/919056
DATED            : July 30, 2013
INVENTOR(S)      : Willbrandt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 277 days.

Signed and Sealed this

Fifteenth Day of September, 2015

Michelle K. Lee
*Director of the United States Patent and Trademark Office*